Figure 1:
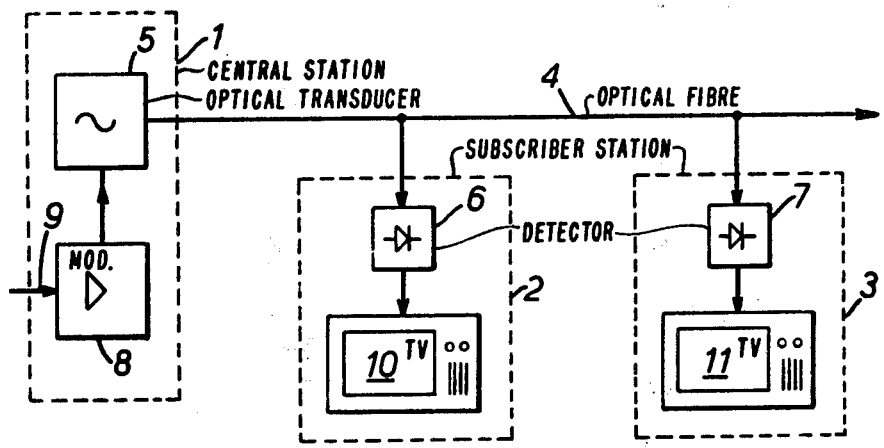

United States Patent [19]

Cutler

[11] 4,135,202
[45] Jan. 16, 1979

[54] BROADCASTING SYSTEMS WITH FIBRE OPTIC TRANSMISSION LINES

[75] Inventor: Albert E. Cutler, Barnet, England

[73] Assignee: Communications Patents Limited, London, England

[21] Appl. No.: 666,267

[22] Filed: Mar. 12, 1976

Related U.S. Application Data

[63] Continuation of Ser. No. 528,849, Dec. 2, 1974, abandoned.

[30] Foreign Application Priority Data

Dec. 3, 1973 [GB] United Kingdom ............... 55933/73

[51] Int. Cl.² ......................... H04N 7/18; H04B 9/00
[52] U.S. Cl. ....................................... 358/86; 325/308; 250/199
[58] Field of Search ............... 325/308, 309; 250/199; 358/86, 901

[56] References Cited

U.S. PATENT DOCUMENTS

| | | |
|---|---|---|
| 1,981,999 | 11/1934 | French ................................. 250/199 |
| 2,100,348 | 11/1937 | Nicholson .......................... 250/199 |
| 2,506,672 | 5/1950 | Kell et al. ...................... 178/DIG. 2 |
| 2,651,715 | 9/1953 | Hines .................................. 250/199 |
| 3,244,809 | 4/1966 | Fuller et al. ........................ 325/308 |
| 3,751,670 | 8/1973 | Grodner et al. ..................... 250/199 |
| 3,845,293 | 10/1974 | Borner .............................. 250/199 |

*Primary Examiner*—Richard Murray
*Assistant Examiner*—Jin F. Ng
*Attorney, Agent, or Firm*—Laurence R. Brown

[57] ABSTRACT

A wired broadcasting system is provided in which a signal path between a central station and at least some of a plurality of subscribers includes an optical fibre extending between an electro-optical transducer and a photo-sensitive detector. The optical fibre may extend over the whole length of the transmission path between the central station and each of the plurality of subscribers, or the optical fibre may extend between the central station and a distribution point from which signals may be conveyed to a group of subscribers over conductive paths, or an optical fibre may be arranged to extend between each of the plurality of subscribers and a programme selector located at a programme exchange.

5 Claims, 4 Drawing Figures

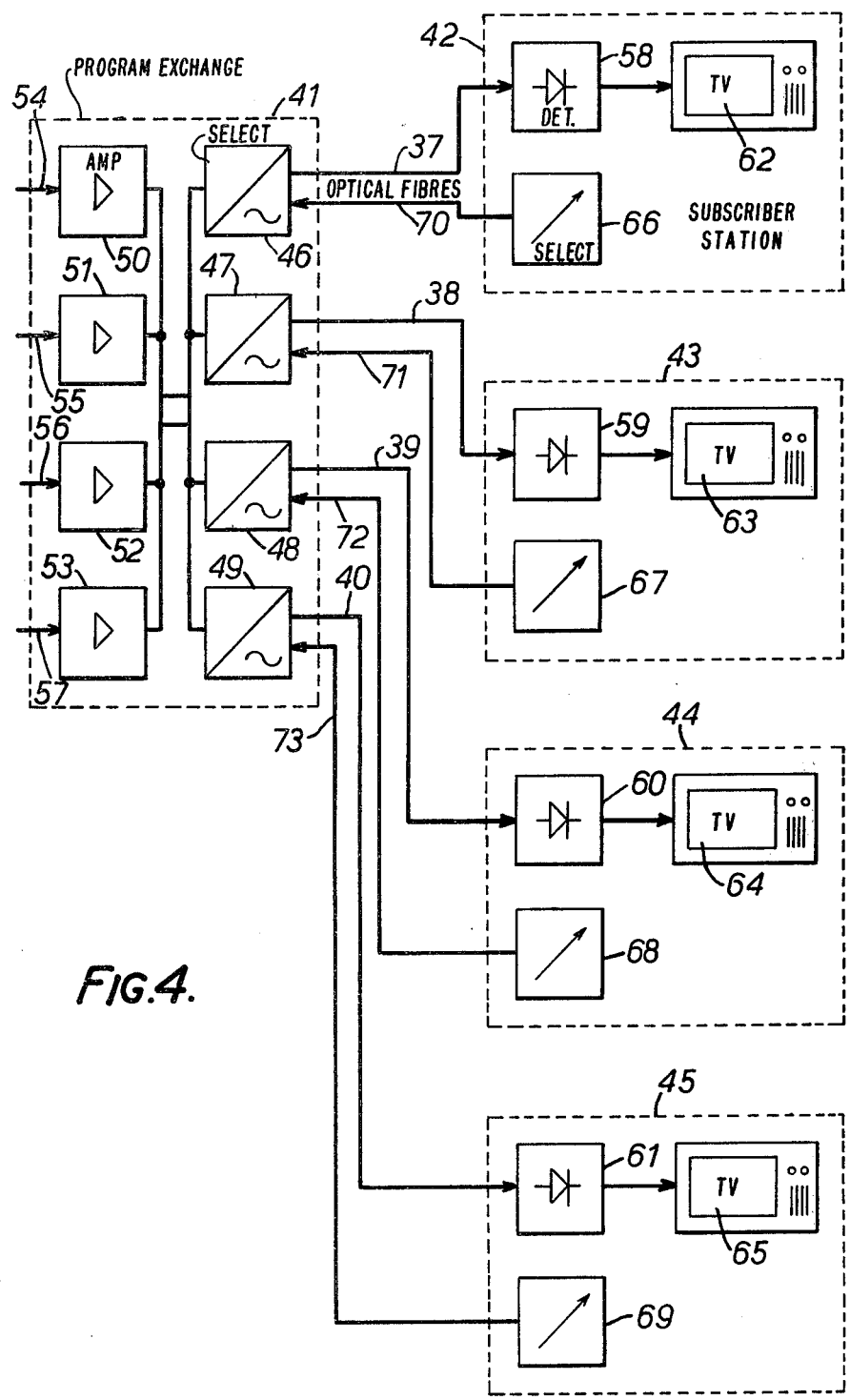

BROADCASTING SYSTEMS WITH FIBRE OPTIC TRANSMISSION LINES

This is a continuation of application Ser. No. 528,849, filed Dec. 2, 1974, now abandoned.

This invention relates to wired broadcasting systems and seeks to provide an improved form thereof.

Wired broadcasting systems comprise two general types. In the first type a plurality of television signals are distributed between a central station and each of a plurality of subscribers over a single signal path, usually in the form of a coaxial cable, the plurality of signals being frequency distinctive. Commonly the range of frequencies employed extends throughout the VHF spectrum, for example, from about 40–300 MHz. In the second type, a plurality of television signals are distributed between a central station and each of a plurality of subscribers over separate signal paths usually in the form of twisted pairs of conductors contained within a common cable. The desired signal is selected for reception by establishing a connection between the subscribers equipment and that pair of conductors carrying the signal required. Commonly the signals all have the same nominal carrier frequency somewhere in the range 2–20 MHz.

Both types of known system referred to above suffer from various disadvantages. With the first type the transmission losses are relatively high due to the frequencies involved and intermodulation in the repeater amplifiers is a problem due to the large number of signals which have to be amplified simultaneously. With the second type crosstalk between the separate signal paths within the common cable is a limitation and in systems where a large number of programmes are distributed the immense number of physical connections between the various conductors introduce maintenance problems.

It is an object of the present invention to provide a wired broadcasting system in which the disadvantages of the presently known systems are minimised.

Accordingly the invention provides a wired broadcasting system in which a signal path between a central station and at least some of a plurality of subscribers includes an optical fibre extending between an electro-optical transducer and a photo-sensitive detector.

If desired, the optical fibre may be arranged to extend over the whole length of the transmission path between said central station and each of the plurality of subscribers. In such an arrangement, a plurality of optical fibres may be provided extending over the whole length of the transmission path between the central station and each of the plurality of subscribers, each subscriber being able to select a desired programme signal on any one of the optical fibres by deriving the signals from a photo-sensitive detector associated with the said one optical fibre.

Alternatively, the optical fibre may extend between the central station and a distribution point from which signals may be conveyed to a relatively small group of subscribers over conventional conductive paths.

In an alternative arrangement an optical fibre may be arranged to extend between each of the plurality of subscribers and a programme exchange at which input signals for each subscribers optical fibre may be selected from one of a plurality of available programme sources. Control of each subscribers programme selection means at the programme exchange may be effected either over a conductive signalling path associated with his optical fibre or over an auxiliary optical fibre. The signals transmitted over the optical fibres may comprise a light beam modulated in respect of video frequency signals, one or more high frequency modulated carrier waves of differing carrier frequency or a combination of video frequency signals and one or more high frequency modulated carrier waves. Each optical fibre may carry two or more light beams of different frequency (colour) each modulated as described above.

Further features and advantages of the present invention will become apparent from the following description of some embodiments thereof given by way of example only with reference to the accompanying drawings in which:

FIG. 1 is a block schematic diagram of one form of wired broadcasting system in accordance with the present invention.

Figure 2:
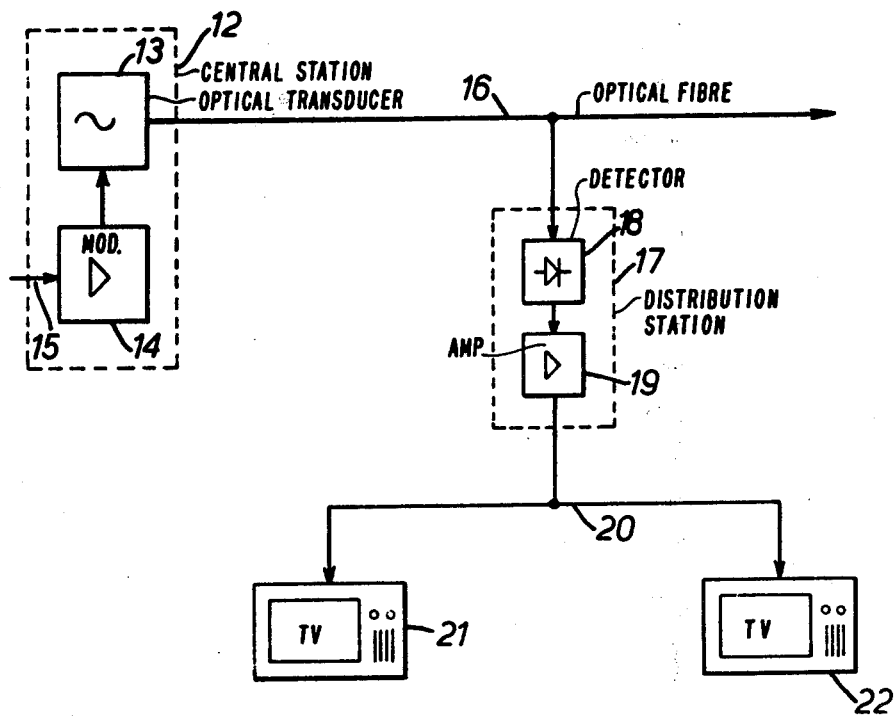
Figure 3:
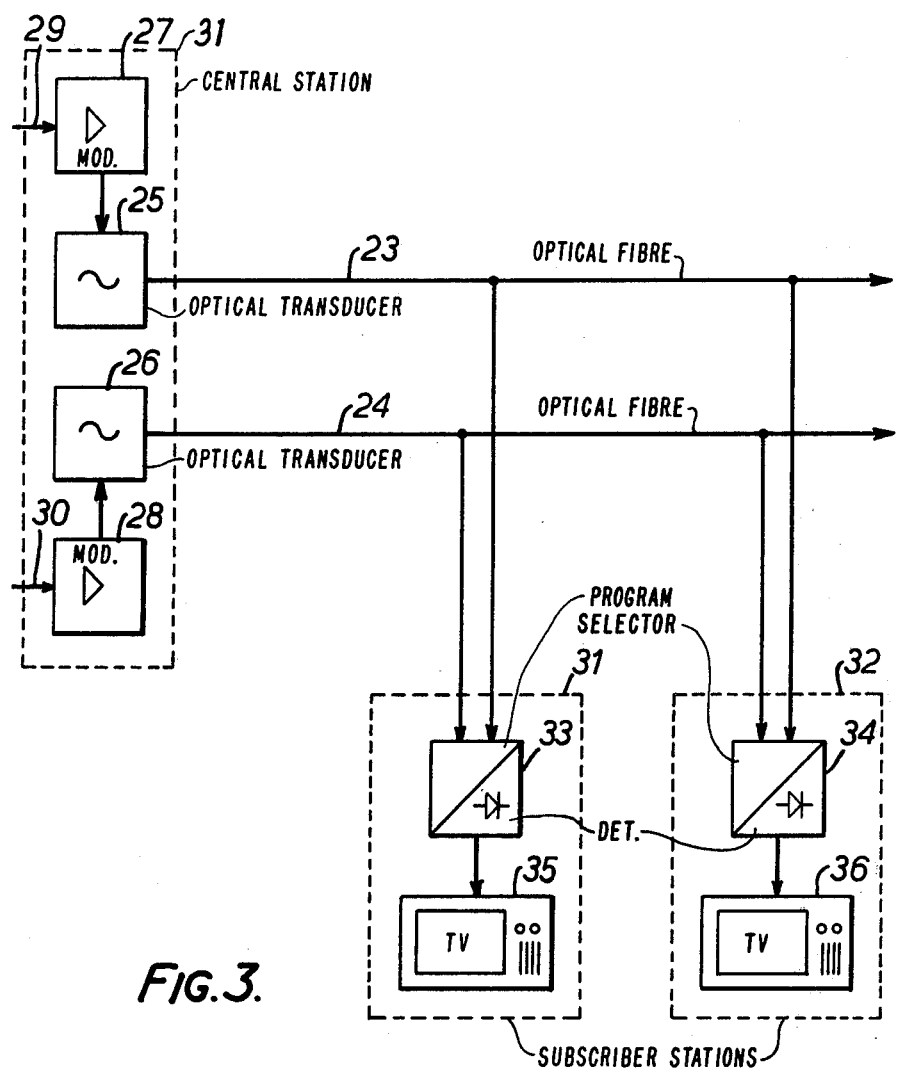

FIG. 2 is a block schematic diagram of a second form of wired broadcasting system in accordance with the present invention FIG. 3 is a block schematic diagram of a third form of wire broadcasting system in accordance with the present invention, and FIG. 4 is a block schematic diagram of a fourth form of wire broadcasting system in accordance with the present invention In the wired broadcasting system shown in FIG. 1 a central station 1 is connected to each of a plurality of subscribers 2, 3, by means of an optical fibre 4 extending between an electro-optical transducer 5 and a photo-sensitive detector 6, 7. The electro-optical transducer 5 may comprise a light emitting diode or an injection laser the light output of which is controlled in response to the output signals of a modulation amplifier 8 to which the video and/or high frequency carrier wave signals are applied on the output line 9. In a case of the electro-optical transducer 5 being a light emitting diode the diode may be formed as a burras diode and have as its active constituent zinc or aluminum doped gallium arsenide. In some applications the modulation characteristic of the electro-optical transducer may be unacceptably non-linear. In this event the modulation signal applied thereto may be such as to cause it to operate in a pulsed mode. The photo-sensitive detectors 6, 7, may comprise PN photo-diodes associated with low noise pre-amplifier devices.

The signals applied to the input line 9 may comprise video frequency signals, one or more high frequency modulated carrier waves of different carrier frequency or a combination of video frequency signals and one or more high frequency modulated carrier waves. In the event that said signals are high frequency modulated carrier waves the output signals provided by the photo-sensitive detectors 6, 7, may be of a form suitable for direct application to the television receivers 10, 11, if these are of a type designed for use in high frequency wired broadcasting systems. There may be a modest advantage in utilising video frequency signals and in this event the output signals from the photo-sensitive detectors may be applied directly to the post detector stages of the receivers 10, 11.

In the system shown in FIG. 2 a central station 12 is provided with an electro-optical transducer 13 modulated by the output signals of a modulation amplifier 14 which receives its input signals over the line 15. The resulting modulated light signals are passed over an optical fibre 16 to distribution stations one of which is shown at 17. Each distribution station is provided with a photo-sensitive detector 18, output signals from which are passed to a launching amplifier 19 from which a conductive network 20 extends to the receivers 21, 22. In this system it is convenient to arrange that the modulation signals applied to the line 15 comprise high frequency modulated carrier waves. In this event, the launching amplifier 19 and receivers 21, 22, may be of the kind presently employed in high frequency wired broadcasting systems.

Turning now to FIG. 3, the system shown therein is arranged to provide two television programmes each distributed over separate optical fibre lines 23, 24. The signals applied to each of these lines are provided by electro optical transducers 25, 26, having associated therewith corresponding modulation amplifiers 27, 28, arranged to receive input signals over the lines 29, 30 and arranged within a central station 31. The separate optical fibres extend to each subscriber 31, 32. Each subscriber is provided with programme selecting means 33, 34 to which each of the optical fibres are connected and by means of which signals may be derived from a photo-sensitive detector associated with that optical fibre which carries the desired programme signal. The desired signal from the programme selection device 33, 34, is then applied to the associated television receiver 35, 36.

The arrangement of FIG. 4 is an alternative system to that shown in FIG. 3. In this arrangement an optical fibre 37, 38, 39, 40, is arranged to extend between a programme exchange 41 and each of a plurality of subscriber installations 42, 43, 44, 45. The signals applied to each optical fibre are derived from a corresponding programme selection device 46, 47, 48, 49, each of which comprises means whereby an electro optical transducer may be made responsive to one of the programmes available at the programme exchange 41 and generate a light beam for transmission to the subscriber. Each programme selection device is arranged to be capable of selecting programmes from any one of the programme amplifiers 50, 51, 52, 53, which receive their input signals over corresponding lines 54, 55, 56, 57. Each subscriber installation comprises a photo-sensitive detector 58, 59, 60, 61 from which signals may be applied to the associated television receiver 62, 63, 64, 65. Each subscriber installation is provided with a programme selector control means 66, 67, 68, 69, which are connected to the corresponding programme selection device 46, 47, 48, 49, over a control signal path 70, 71, 72, 73 associated with that subscribers opical fibre. The control signal path may comprise one or more conductors or an auxiliary optical fibre.

The programme capacity of any of the systems described above may be increased by arranging that each optical fibre carries two or more light beams of a different frequency (colour). Each light beam may be modulated in respect of one or more than one television or other signal. The light beams may be coupled into and out of the optical fibre by means of systems of di-chroic mirrors. If simultaneous reception of the separate light beams is not required the photo-sensitive detector may be rendered responsive to the appropriate light beam by means of a suitable colour filter.

What is claimed is:

1. A broadcasting system conveying signals by a signal path between a central station and a plurality of subscribers, comprising in combination, a common optical fibre in said signal path carrying signals to said plurality of subscribers from said central station, said fibre extending between an electro-optical transducer at said central station producing a light beam and photo-sensitive detector means at a reception position near the subscribers station, transmission means at the central station modulating the light beam for transmission through said optical fibre, said transmission means including modulation means producing a light beam modulated by a high frequency carrier which itself is modulated with video broadcast signals, conventional television receivers at the subscriber stations responsive to receive said high frequency carrier modulated with video broadcast signals, light beam demodulation means at said reception position responsive to said photo-sensitive detector means to convert said light beam into demodulated high frequency carrier radio wave signals modulated with video broadcast signals, and means coupling said demodulated signals from said reception position to said subscriber stations in a form suitable for direct application to said conventional television receivers without further signal processing.

2. A system according to claim 1, wherein the optical fibre extends over the whole length of the transmission path between the central station and each of the plurality of subscribers.

3. A system according to claim 2, wherein said system includes a plurality of said optical fibres, means modulating a light beam carried respectively by each fibre with a different video programme signal, each fibre extends over the whole length of the transmission path between the central station and said detector means, said detector means comprising photo sensing means being positioned at a station location for each of the plurality of subscribers.

4. A system according to claim 1, wherein the central station has means conveying by optical fibre a plurality of programmes, including a programme exchange at said central station providing a programme selector for deriving one of said plurality of programmes, an additional optical fibre is arranged to extend between each of the plurality of subscribers and said programme selector and each subscriber has selection means operable over said additional fibre to select a single one of said plurality of programmes.

5. A system as defined in claim 1 including means at said central station conveying over said single optical fibre a plurality of programmes modulated on different carrier frequencies.

* * * * *